United States Patent
Rathmann-Ramlow et al.

(10) Patent No.: US 8,469,396 B2
(45) Date of Patent: Jun. 25, 2013

(54) RESTRAINT SYSTEM WITH BELT TENSIONER AND AIRBAG

(75) Inventors: Thomas Rathmann-Ramlow, Ense (DE); Ulf Gruene, Ense-Hünningen (DE)

(73) Assignee: Schroth Safety Products GmbH, Arnsberg (DE)

( * ) Notice: Subject to any disclaimer, the term of this patent is extended or adjusted under 35 U.S.C. 154(b) by 247 days.

(21) Appl. No.: 13/029,680

(22) Filed: Feb. 17, 2011

(65) Prior Publication Data

US 2011/0204605 A1 Aug. 25, 2011

Related U.S. Application Data

(60) Provisional application No. 61/372,328, filed on Aug. 10, 2010.

(30) Foreign Application Priority Data

Feb. 19, 2010 (DE) .................. 10 2010 008 704

(51) Int. Cl.
*B60R 21/18* (2006.01)
(52) U.S. Cl.
USPC .......................................... 280/733; 280/808

(58) Field of Classification Search
USPC .................... 280/733, 801.1, 808, 730.1
See application file for complete search history.

(56) References Cited

U.S. PATENT DOCUMENTS

| | | | | |
|---|---|---|---|---|
| 5,393,091 A | * | 2/1995 | Tanaka et al. | 280/733 |
| 5,466,002 A | * | 11/1995 | Tanaka et al. | 280/733 |
| 6,010,150 A | * | 1/2000 | Amann | 280/730.2 |
| 6,378,898 B1 | * | 4/2002 | Lewis et al. | 280/733 |
| 6,382,666 B1 | * | 5/2002 | Devonport | 280/733 |
| 6,705,244 B1 | * | 3/2004 | Berger et al. | 112/475.06 |
| 7,481,452 B2 | * | 1/2009 | Itoga et al. | 280/733 |
| 7,571,931 B2 | * | 8/2009 | Watanabe | 280/733 |
| 7,584,992 B2 | * | 9/2009 | Riedel et al. | 280/736 |
| 7,604,253 B2 | * | 10/2009 | Nezaki et al. | 280/733 |
| 8,038,170 B2 | * | 10/2011 | Haraoka et al. | 280/733 |
| 2007/0126213 A1 | * | 6/2007 | Korechika | 280/730.2 |
| 2011/0187087 A1 | * | 8/2011 | Kibat | 280/730.2 |

* cited by examiner

*Primary Examiner* — Drew Brown
(74) *Attorney, Agent, or Firm* — Kane Kessler, P.C.; Paul E. Szabo

(57) ABSTRACT

A restraint system for occupants of a vehicle includes a belt (2, 2') and a belt-tensioning means as well as an airbag (3, 4) arranged on the belt (2, 2'), wherein at least a certain part of the belt (2, 2') is at least temporarily tensioned when the belt-tensioning means is activated, wherein the airbag (3, 4) serves as the belt-tensioning means.

7 Claims, 2 Drawing Sheets

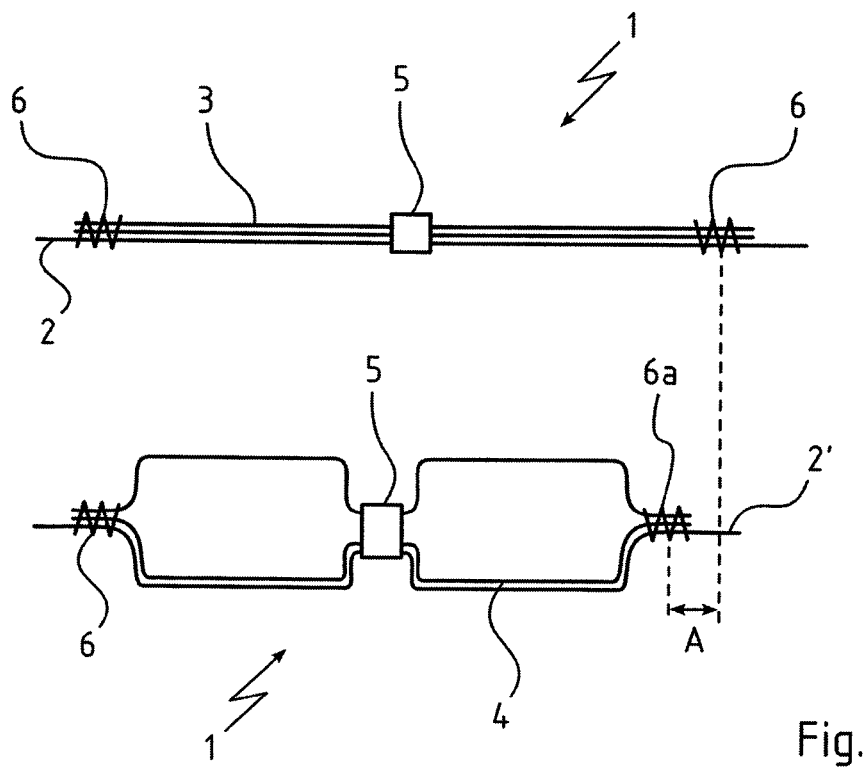
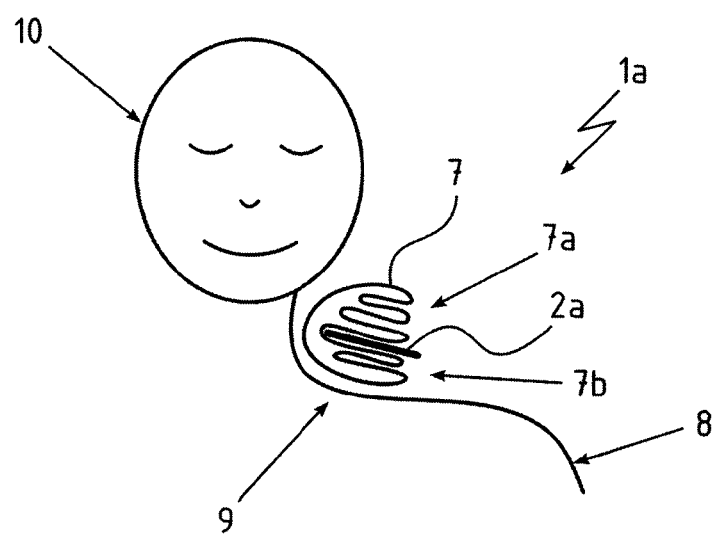
Fig. 1
Fig. 2

RESTRAINT SYSTEM WITH BELT TENSIONER AND AIRBAG

This application claims the benefit of U.S. Provisional Patent Application No. 61/372,328, filed Aug. 10, 2010, the entire disclosure of which is incorporated by reference.

BACKGROUND OF THE INVENTION

The invention pertains to a restraint system for the occupants of a vehicle according to the features in the introductory clause of Claim 1.

To ensure the safety of the occupants of land vehicles, aircraft, and watercraft, restraint systems suitable to each case are installed. A combination of an airbag and a safety belt as well as means for tensioning the belt are used to minimize the consequences of an accident. Whereas the safety belt, which has been tensioned during the course of an accident, holds the vehicle occupant securely in his seat, the inflated airbag decelerates at least certain parts of the accelerated body of the passenger. These devices in their totality significantly decrease the forces of deceleration which act on the vehicle occupants when an accident occurs. The injuries which might result from an accident are therefore reduced or possibly even prevented entirely.

Whereas the tensioned safety belt reduces the acceleration of the torso when the vehicle is involved in a collision, the extremities and especially the head are still subject to initial acceleration and deflection. To reduce the deflection of the head and to cushion its impact in closed vehicles, head airbags are used, which are installed in the area of the door, the pillar, or the roof. So that the airbag, when in its original position, will be as close as possible to the body areas of the occupant to be protected, systems are already known which mount the airbag on the safety belt.

SUMMARY OF THE INVENTION

The invention is based on the goal of creating a compactly designed and easily retrofittable restraint system, which comprises a belt, a means for tensioning the belt, and an airbag arranged on the belt.

According to the invention, this goal is achieved by a restraint system with a belt, a belt-tensioning means, and an airbag according to the features of Claim 1.

The restraint system designed in this way for the occupants of vehicles such as land vehicles, watercraft, or aircraft comprises a belt and a belt-tensioning means as well as an airbag arranged on the belt. At least a certain part of the belt is at least temporarily tensioned when the belt-tensioning means is activated. According to the invention, the airbag serves simultaneously as the belt-tensioning means. Because the airbag and the belt-tensioning means are assembled into a single functional unit, a highly compact restraint system is obtained, which can be easily integrated into already existing vehicles with belt attachment points. The special advantage of the invention is therefore to be found in the ease with which an already existing belt system can be replaced. Through the use of the proposed system, vehicles which are built to save as much weight as possible and which are therefore primarily functional in design, such as aircraft, can be provided with a light-weight restraint system which requires only a few procedures to integrate it into the existing interior architecture and which offers a high level of safety while simultaneously being compact in design.

The invention also provides that the restraint system comprises at least one throttle loop, which extends at least partially around the folded airbag and which is arranged between the two longitudinal ends of the belt. The throttle loop holds the folded airbag firmly in position. In addition, the throttle loop prevents the airbag from unfolding unintentionally. In its position extending around the airbag, it can be seen that the width of the throttle loop is smaller than the length of the airbag extending along the length of the belt. The throttle belt covers only a small part of the airbag.

The inflation behavior of the airbag can be controlled by the throttle loop. The more tightly the throttle loop encircles the airbag, the smaller is the remaining cross section available to the expanding gas which flows through the airbag. The position of the throttle loop influences the expansion of the airbag. The area of the airbag which, with respect to the direction in which the gas flows, is upstream of the throttle loop, expands more quickly, whereas the area of the airbag located downstream of the throttle loop expands more slowly than the upstream area.

According to the invention, the airbag is connected to the belt at least at the two end areas (6, 6*a*) which are opposite each other in the longitudinal direction of the belt. In combination with the throttle loop, therefore, the airbag is fixed in its position with respect to the belt at a minimum of three points. In the folded state, the airbag is covered by a suitable cover. The folded airbag is protected by the cover from the intrusion of foreign bodies. The cover protects the airbag from any possible damage which might be caused by external influences, which could lead, for example, a perforation of the airbag.

It is advantageous for the airbag, when in its expanded state, to be constricted by the throttle loop. The expansion of the airbag is limited by the end areas of the airbag connected to the safety belt and by the throttle loop situated between the end areas. The constriction of the airbag has the effect of reducing the length of the belt between the ends of the airbag, as a result of which this area of the belt is pulled tight.

In a variant, the constriction present in the expanded state of the airbag can be released. When the internal pressure in the airbag exceeds a certain level, the throttle loop becomes detached. The constriction is released. What we have then is a two-stage system:

The release of the constriction has the effect of protecting the airbag from the excessive load which the occupant might exert on it. This high level of load is attributable to the deceleration of the occupant.

As a result of the release of the constriction, furthermore, the belt relaxes to a certain extent from its tightened position, and the volume and pressure of the airbag not only change but also become differently distributed. The occupant's body therefore experiences a two-stage deceleration.

According to an advantageous embodiment, the throttle loop extends at least partially around the belt. If the throttle loop is closed, the position of the loop on the belt can therefore be shifted, and the loop can thus also be shifted along the belt with respect to the airbag. This ability to change the position of the loop means that it is possible to select the best possible location for it. The throttle loop can be fixed in place customizably at any point between the two ends of the airbag.

It is preferable for the throttle loop to be arranged on the restraint system in the area of the occupant's shoulder. The restraint system is in particular a harness. Here the throttle loop fulfills the task of shortening the distance between the two ends of the airbag by causing the expanded airbag to assume a certain curvature. In addition, the position of the throttle loop is selected in such a way that the larger volume component of the airbag, which has been partially constricted by the throttle loop, lies in front of the occupant's face. The occupant's head, which has been deflected in the travel direction, is therefore provided with especially effective protection in the event of a crash.

In a preferred embodiment, the airbag is arranged in such a way that it extends in a U-shaped manner around at least a certain part of the belt. As a result, part of the airbag lies between the area of the occupant's shoulder and the belt. In the case of crash, the expanded airbag therefore lifts the airbag slightly from the occupant's shoulder, as a result of which a tensioning effect is exerted on the belt resting on the occupant's body.

It is provided that the airbag is arranged on a part of the belt lying in the area of the occupant's shoulder and that the closed part of the U-shaped fold by which the airbag extends around the belt is oriented toward the center of the occupant's body. The way in which the airbag wraps around the belt thus has the effect of shielding the occupant's body from a certain part of the belt, thus reducing the cutting effect of the belt as much as possible.

In a preferred embodiment, one-third of the expanded volume of the airbag is located between the occupant and the belt. This results in a suitable relationship between the tensioning of the belt and the protection offered to the occupant's head area.

To achieve an especially compact design, the airbag itself comprises a gas generator. This can also be arranged on the belt. As a result, there is no need to install a complicated feed line to supply the gas pressure required to expand the airbag. The gas generator integrated into the airbag unit is connected to a sensor system, which detects the occurrence of an accident. The gas generator could also be mounted on the vehicle, in which case the gas generator would be connected to the airbag by a gas supply line. The triggering of the sensor system activates the gas generator, as a result of which the gas is conducted into the airbag via the appropriate gas-carrying connection. The required sensor system is for this purpose connected to the gas generator by a signal line. In principle, however, it would also be possible to use other means of signal transmission analogous to a signal line such as optical or wireless connections. In general, the required sensor system can also be integrated directly into the airbag unit to obtain an especially compact construction.

Seats in vehicles for conveying passengers such as busses, trains, and airplanes can be equipped with the system presented here. If belts are already present, these can be easily upgraded. It is also possible in particular to protect the occupants of aircraft, such as the pilots, in a simple and effective manner.

BRIEF DESCRIPTION OF THE DRAWINGS

The invention is explained in greater detail below on the basis of the exemplary embodiments illustrated schematically in the figures:

FIG. 1 shows a belt and an airbag arranged thereon representing part of an inventive restrain system;

FIG. 2 shows a cross-sectional view of a variant of the restraint system of FIG. 1 in the unactivated state;

DETAILED DESCRIPTION

Figure 3:
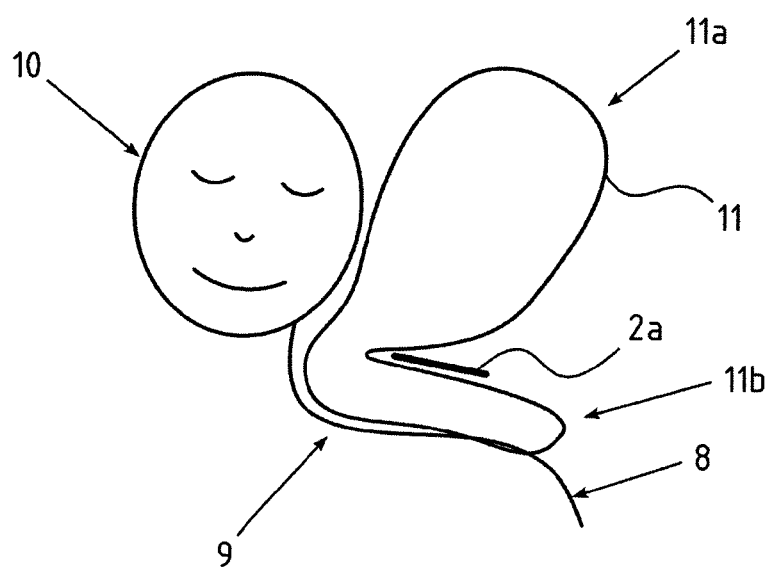
FIG. 3 shows a similar view of the restraint system of FIG. 2 in the activated state.

FIG. 1 shows an inventive restraint system 1 both in the unactivated and in the activated state. The restraint system 1 comprises a belt 2, only part of which is shown, on which an unactivated, specifically a folded, airbag 3 is arranged. The activated state of the airbag 3 on a belt 2' is also shown, where the expanded airbag 4 comprises a volume considerably greater than that of the unactivated airbag 3.

The restraint system 1 comprises a throttle loop 5, which is arranged in the middle, between the two end areas 6 of the airbag 3, 4. In the diagram, the throttle loop 5 extends around a certain part of the airbag 3, 4 and of the belt 2, 2'. Specifically in the expanded state of the airbag 4, the airbag is constricted by the throttle loop 5, as a result of which the curvature which has already developed toward the two end areas 6 in the expanded state is increased by an additional curvature around the throttle loop 5 in the area of the constriction.

As a result, the belt 2' is deflected several times between the end areas 6 of the expanded airbag 4. This has the effect of decreasing the length of the belt 2' between the two end areas 6, wherein the one end area 6a is shifted by a distance A from its previous position by the shortening of the belt 2'. The expansion of the airbag 4 thus reduces the length of the belt 2', as a result of which the belt as a whole is tightened.

FIG. 2 shows a variant of the restraint system 1 in the form of a restraint system 1a. The restraint system 1a comprises a belt 2a, which is deployed in the usual way and which is provided with a folded airbag 7, specifically an unactivated airbag. The belt 2a extends here along the shoulder area 9 of the occupant 8, wherein the airbag 7 is also arranged in the shoulder area 9 of the occupant 8. Because the airbag 7 is located in the shoulder area 9 of the occupant 8, the occupant's head 10 is especially well protected when the airbag 7 is activated.

The airbag 7 is folded in such a way that it extends in a U-shaped manner around the belt 2a, wherein the closed part of the U-shaped fold is oriented toward the center of the body of the occupant 8. The airbag 7, furthermore, is folded in its U-shaped manner around the belt 2a in such a way that it is divided into an upper airbag 7a arranged between the belt 2a and the head 10 of the occupant 8 and a lower airbag 7b arranged between the belt 2a and the shoulder area 9 of the occupant 8. It can be easily seen even here that the airbag 7a in the upper position is larger than the airbag 7b in the lower position.

FIG. 3 shows the restraint system 1a illustrated in FIG. 1 in the activated state. The airbag 7, which is still folded in FIG. 2, is shown here in the form of an activated and therefore expanded airbag 11. As a result of the U-shaped manner in which the airbag 11 extends around the belt 2a, the airbag is divided in the expanded state as well into an expanded airbag 11a situated above the belt 2a and an expanded airbag 11b situated lower down. The total volume 11 of the airbag is divided in such a way that the lower airbag 11b holds approximately one-third of the volume, whereas the upper airbag 11a comprises two-thirds of the total volume of the expanded airbag 11.

Especially as a result of the lower airbag 11b, the belt 2a is kept a certain distance away from the shoulder area 9 of the occupant 8 in the activated, specifically in the expanded, state. As a result of the U-shaped manner in which the airbag 11 extends around the belt, the neck area adjacent to the shoulder area 9 of the occupant 8, i.e., the area near the head 10, is also protected from the belt 2a, which usually exerts a cutting type of effect.

The upper part of the airbag 11a is completely expanded in the area of the head 10 of the occupant 8, so that the head 10 is protected. Because the belt 2a is lifted away from the shoulder area 9 of the occupant 8, the belt 2a is also tightened, as a result of which the restraining forces exerted on the occupant 8 are increased.

The invention claimed is:

1. Restraint system for occupants of a vehicle, which comprises a belt and a belt-tensioning means arranged on the belt, wherein at least a certain part of the belt is at least temporarily tensioned when the belt-tensioning means is activated, wherein an airbag serves as the belt-tensioning means; characterized in that the restraint system comprises at least one throttle loop, which extends at least partially around the folded airbag and which is arranged between the two end areas of the bag which are opposite each other in the longitudinal direction of the belt.

2. Restraint system according to claim 1, characterized in that the airbag is connected to the belt at least at the two end areas which are opposite each other in the longitudinal direction of the belt.

3. Restraint system for occupants of a vehicle, which comprises a belt and a belt-tensioning means arranged on the belt, wherein at least a certain part of the belt is at least temporarily tensioned when the belt-tensioning means is activated, wherein an airbag serves as the belt-tensioning means; characterized in that the airbag is connected to the belt at least at the two end areas which are opposite each other in the longitudinal direction of the belt.

4. A restraint system for an occupant of a vehicle, comprising:
   a belt; and
   an actuatable airbag on the belt, a first portion of the airbag being connected to a first portion of the belt and a second portion of the airbag being connected to a second portion of the belt spaced apart from the first portion of the belt;
   the first and second portions of the airbag moving toward each other in response to actuation of the airbag, thereby causing the first and second portions of the belt to move toward each other, thereby to tension the belt;
   comprising at least one throttle loop which extends at least partially around the folded airbag between the first and second portions of the air bag to constrict the airbag when inflated.

5. A restraint system as set forth in claim 4 wherein the throttle loop is detached when the internal pressure in the airbag exceeds a predetermined level.

6. A restraint system for an occupant of a vehicle, comprising:
   a belt; and
   an actuatable airbag on the belt, a first portion of the airbag being connected to a first portion of the belt and a second portion of the airbag being connected to a second portion of the belt spaced apart from the first portion of the belt;
   the first and second portions of the airbag moving toward each other in response to actuation of the airbag, thereby causing the first and second portions of the belt to move toward each other, thereby to tension the belt;
   wherein the airbag is folded around the belt in a U-shaped manner and the closed part of the U-shaped fold of the airbag is oriented toward the center of the body of the occupant when the restraint system is in use.

7. A restraint system for an occupant of a vehicle, comprising:
   a belt; and
   an actuatable airbag on the belt, a first portion of the airbag being connected to a first portion of the belt and a second portion of the airbag being connected to a second portion of the belt spaced apart from the first portion of the belt;
   the first and second portions of the airbag moving toward each other in response to actuation of the airbag, thereby causing the first and second portions of the belt to move toward each other, thereby to tension the belt;
   characterized in that the airbag when in its expanded state is constricted by a throttle loop, the constriction present in the expanded state of the airbag can be released by the tearing of the throttle loop, the throttle loop is disposed on the restraint system in the shoulder area of the occupant when in use, and one-third of the expanded volume of the airbag is located between the occupant and the belt.

* * * * *